May 1, 1951     A. D. RICHARDSON     2,550,720
SUSPENSION GALVANOMETER AND MAGNET ASSEMBLY
Filed May 29, 1946     3 Sheets-Sheet 1

INVENTOR.
ARTHUR D. RICHARDSON
BY
Christie & Angus
ATTORNEYS

May 1, 1951              A. D. RICHARDSON              2,550,720
SUSPENSION GALVANOMETER AND MAGNET ASSEMBLY
Filed May 29, 1946              3 Sheets-Sheet 2
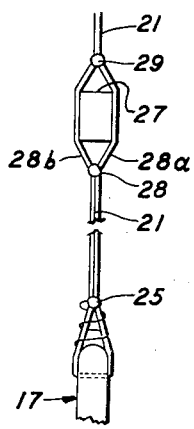
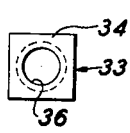
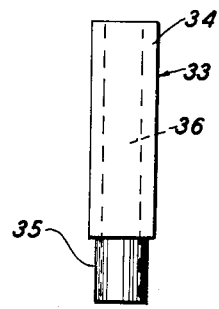
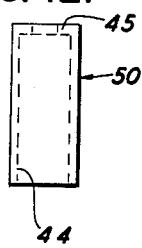
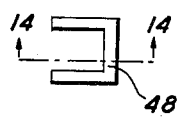
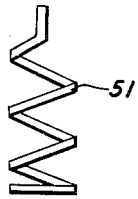
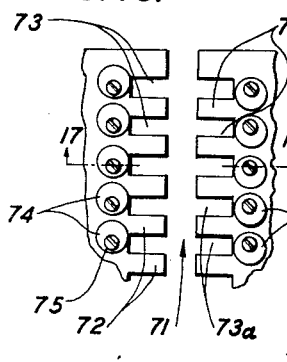
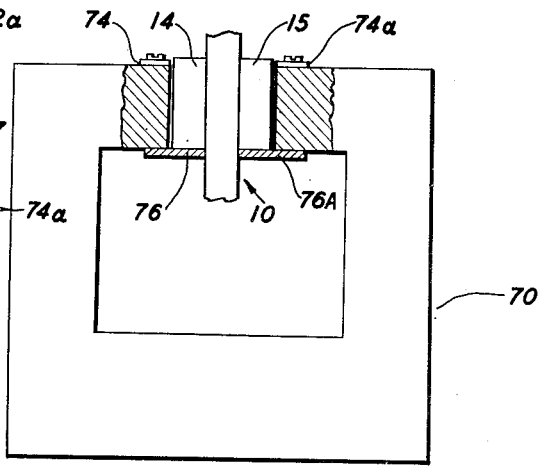
*INVENTOR.*
ARTHUR D. RICHARDSON
BY
Christie & Angus
*ATTORNEYS*

May 1, 1951 A. D. RICHARDSON 2,550,720
SUSPENSION GALVANOMETER AND MAGNET ASSEMBLY
Filed May 29, 1946 3 Sheets-Sheet 3

INVENTOR.
ARTHUR D. RICHARDSON
BY
Christie & Angus
ATTORNEYS

Patented May 1, 1951

2,550,720

UNITED STATES PATENT OFFICE 2,550,720

SUSPENSION GALVANOMETER AND MAGNET ASSEMBLY

Arthur D. Richardson, Pasadena, Calif., assignor to Consolidated Engineering Corporation, Pasadena Calif., a corporation of California Application May 29, 1946, Serial No. 673,111

5 Claims. (Cl. 171—95)

This invention relates to galvanometers of the type adapted to respond to alternating or oscillating voltages, and more particularly to the type of laboratory and portable galvanometers used for recording alternating voltage oscillations.

Galvanometers of this type have been in use for a considerable time in recording cameras and the like. Such galvanometers commonly comprise a lightweight coil suspended between the poles of a magnet by means of a pair of suspension wires or cords. The oscillating voltage to be indicated by the galvanometer is connected to the coil terminals so that the coil oscillates accordingly. A mirror attached to the suspension cord oscillates according to the oscillations of the coil so that a light beam reflected from the mirror correspondingly oscillates back and forth on a surface against which it is directed. According to a common practice, such a galvanometer is often placed in a camera, usually with a number of other similar galvanometers, and a photographic film or paper strip is moved while the oscillating reflected light beam is on it so that an oscillating line or trace is made on the photographic strip of the oscillation from the mirrors.

The principal object of my invention is to provide a galvanometer of this type which is of a simple, small and lightweight construction providing easy access to the component parts.

A related object is to provide such a galvanometer whose position may be readily adjustable without disturbing the characteristics of the galvanometer.

I carry out my invention by the provision of an extremely lightweight and narrow coil held in suspension between a pair of stretched wires which constitute the axis of rotary movement of the galvanometer coil. I support this galvanometer element within an elongated casing preferably provided with a removable side or cover so that the elements are open to inspection and removal and adjustment. I provide in close association with the galvanometer coil a pair of pole pieces extending beyond the sides of the casing and adapted to be engaged by a suitable pole magnet. The arrangement is such that adjustment for the tilt of the galvanometer assembly can be made without disturbing the magnetic circuit.

The foregoing and other features of my invention will be better understood from the following detailed description and the accompanying drawings of which:

Fig. 8 shows the arrangement of a mirror in relation to the coil, used in the galvanometer;

Fig. 9 is an end view, and Fig. 10 an elevation view of a sleeve used in the galvanometer;

Fig. 11 is an end view, and Fig. 12 an elevation view of another bushing used in the galvanometer;

Fig. 13 shows a spring used with the bushing of Fig. 12;

Fig. 14 shows a cross-section view taken at line 14—14 of Fig. 15; and

Fig. 15 shows a face view of a member associated with the bushing of Fig. 12;

Fig. 16 shows a magnet adapted to receive a plurality of the galvanometers shown in Figs. 1 and 2; and Fig. 17 is a cross-section view taken at line 17—17 of Fig. 16;

Figure 1:
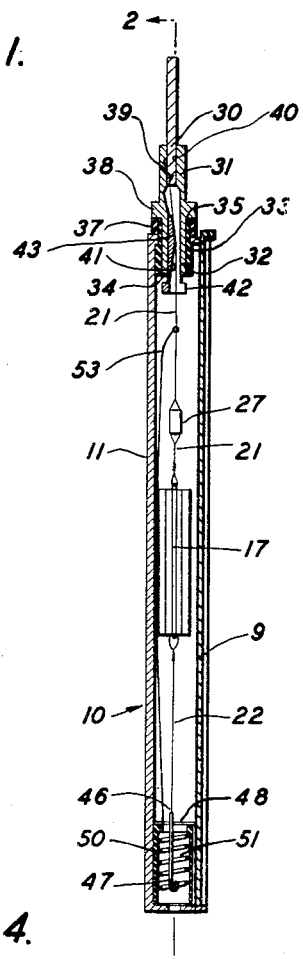
Fig. 1 shows a front elevation in cross-section, of a galvanometer according to my invention.
Figure 2:
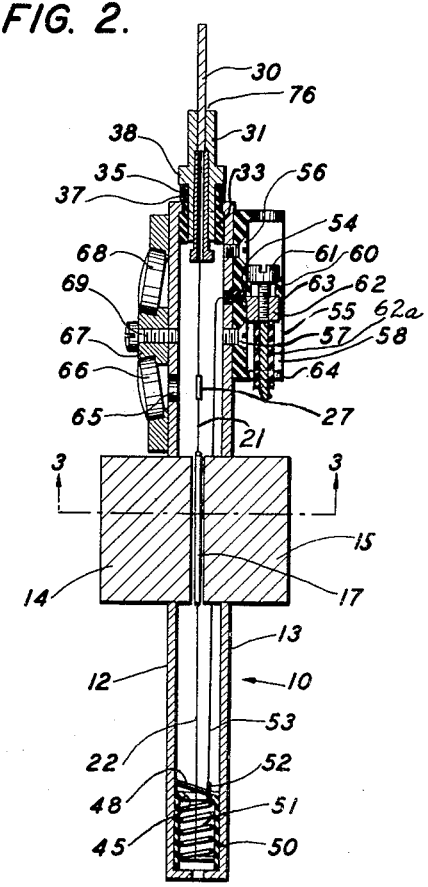
Fig. 2 is a side elevation view in cross-section taken at line 2—2 of Fig. 1.
Figure 3:
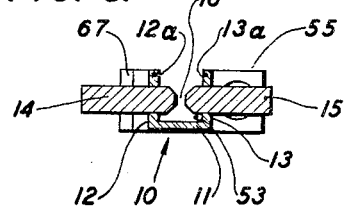
Fig. 3 is a top cross-sectional view taken at line 3—3 of Fig. 2.
Figure 18:
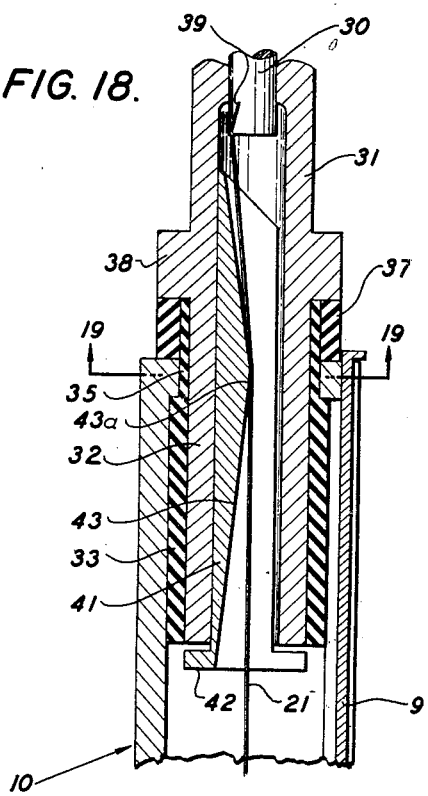
Fig. 18 is an enlarged front elevation view in cross section, showing the details of the upper portion of the galvanometer; and, Fig. 19 is a cross section view taken at line 19—19 of Fig. 18.
Figure 19:
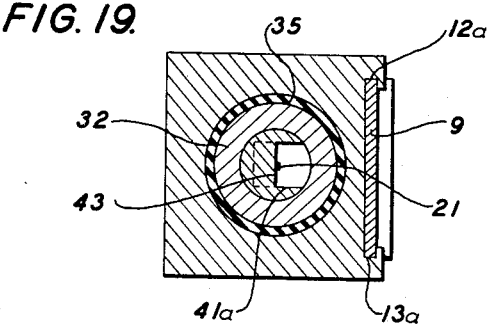

Referring to the galvanometer shown in Figs. 1 to 3, the instrument comprises a casing 10 in the form of a square or rectangular prism whose length is many times greater than its cross-sectional dimension. The casing comprises an elongated back strip 11 and two side strips 12 and 13. A cover 9 is adapted to be put on or taken off by sliding it in grooves 12a and 13a placed in side plates 12 and 13. There are fastened through the sides 12 and 13 of the casing, a pair of pole pieces 14 and 15. These are rigidly fastened in position in the casing in some suitable manner so as to leave a narrow elongated gap 16 between the two pole pieces in a central location in the casing as shown in Figs. 2 and 3.

Figure 4:
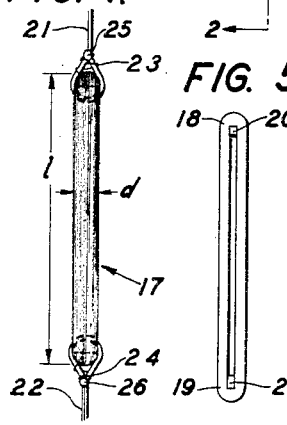
Fig. 4 shows a front view of a coil assembly used in the galvanometer.
Figure 5:
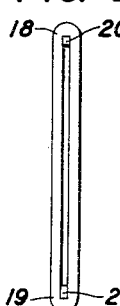
Fig. 5 is a side view of the coil shown in Fig. 4.

There is suspended within this narrow gap between the pole pieces, an elongated coil 17 of fine wire shaped to occupy a very small cross-sectional area. This coil is shown enlarged and in better detail in Figs. 4 and 5. It is composed of a fine insulated wire, such as No. 48 enameled, or even thinner, and may be on an arbor formed suitable for winding such fine wire. The winding is preferably done in such a manner that the coil is substantially cylindrical in form with a circular cross-section having a diameter $d$. The wires forming this coil are preferably cemented together so that the coil maintains a rigid self-supporting form. The long dimension $L$ may conveniently be about .5 and the diameter $d$ in the neighborhood of .015 inch.

Figure 6:
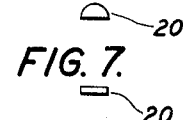
Fig. 6 shows a front view, and Fig. 7 an end view of a detail used with the coil shown in Figs. 4 and 5.
Figure 7:
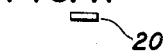

There is inserted inside each extremity of the coil a semi-circular member in the form of a half disc 20 with its straight edge at the loop of the coil, as shown in Figs. 6 and 7. The half discs 20 are preferably of insulating material to avoid danger of short-circuiting the coil turns. For the purpose of suspending the coil in position in the air gap 16, there are provided thin suspension wires 21 and 22 at each end of the coil, these suspension wires being looped through the coil and inside the arcuate surfaces of the respective members 20. The wires 21 and 22 may conveniently be a No. 49 wire rolled flat .0002 to .005 inch of gold or gold alloy. The ends 23 and 24 of the fine wire forming the coil 17 are brought out loosely and preferably are looped around the respective loops of the suspension wires 21 and 22, as shown. The loops of wires 21 and 22 are maintained by solder at positions 25 and 26 respectively, and the ends of wires 23 and 24 are also soldered at the same points, thereby making the wires 21 and 22, in effect, the terminals of the coil.

One of the wires, namely wire 21, has attached to it a small mirror 27. The mirror is rectangular in shape and its arrangement with wire 21 is shown more clearly in the enlarged view in Fig. 8. The wire 21 looped at coil 17 and soldered at 25, has its two strands carried parallel from the solder point 25 to another solder point 28 close to the position of the mirror. At point 28, the two strands of wire 21 divide, one of them, 28a, being carried along one of the longer edges of the mirror, and the other of them, 28b, being carried along the other long edge of the mirror. At the opposite side of the mirror, the two separated strands 28a and 28b are joined again at a solder point 29. At this point, only a single strand of wire, 21, is carried on up.

For the purpose of suspending this mirror and coil assembly with suspension wires 21 and 22, centrally within the casing, there is provided at one end of the casing a wire holding member 30 in the form of a cylindrical rod, and at the other end of the casing a compression spring 51 held within an insulator bushing 50, the wire 22 being hooked to the spring. For the purpose of holding member 30, there is provided a bushing 31, preferably of a metal such as brass like the metal of the casing. The bushing 31 is provided with a cylindrical sleeve portion 32 which is fitted within an insulating bushing 33. The construction of bushing 33 is shown in enlarged and greater detail in Figs. 9 and 10. It comprises a section of square cross-section 34 adapted to fit within the walls of the casing, and the outer end of it is made cylindrical at 35 where it protrudes through the opening in the end of the casing. A cylindrical hole 36 passes centrally through the bushing and the cylindrical sleeve portion 32 fits within the hole 36. In assembling the arrangement, an insulating collar or washer 37 is placed around the cylindrical portion 35 to separate the collar 38 of the bushing 31 from the metallic casing.

The outer portion of bushing 31 is provided with a small cylindrical bore through which the cylindrical rod 30 passes with a tight fit. At the inner edge of rod 30 there is provided a slot 39 into which the end of wire 21 is inserted and soldered firmly.

For the purpose of centering the wire 21 and of adjusting its effective length, there is provided a sleeve 41 having a collar 42 at its inner end. This sleeve has a cylindrical shank which is adapted to slide with a tight fit in and out of the sleeve portion 32 of bushing 31. The sleeve 41 is formed with an open U-shaped slot 41a extending vertically throughout the length of the slot to allow space for the wire ribbon 21 to lie in. Within the slot at the base of the U is a protuberance 43 which extends from the lower to the upper end of the slot. The protuberance tapers from both its upper and lower ends and is a maximum at a position 43a. The protuberance extends longitudinally and the thickest point 43a is at the longitudinal axis so that the wire ribbon 21 in resting on this protuberance, is thereby centered in the casing. By sliding sleeve 41 in and out of the bushing, the position of the protuberance 43 in the longitudinal or axial direction is changed, thereby effectively shortening or lengthening the effective length of wire 21 from the coil 17.

The insulating bushing 50 located at the opposite end of the casing is illustrated in Figs. 11 and 12. It has outer side walls formed of a square section to fit within the end of the casing; and it is provided with a central bore 44 adapted to accommodate the compression spring 51 illustrated in detail in Fig. 13. For the purpose of retaining the spring in the bushing, the bushing is provided with an internal collar 45 large enough to hold the spring but allowing sufficient room for the wire 22 to pass centrally through.

The end of wire 22 is soldered at 46 to a hook 47 which is hooked over the outer end of the spring. For the purpose of holding the spring and insulating bushing assembly in its proper position within the end of the casing, there is provided a holding member 48 in the form of a horseshoe-shaped member as shown in Figs. 14 and 15. This is wedged within the casing so that it rests against the sides thereof.

The length of wire 22 is such that when hook 47 is hooked over the end loop of spring 51, the spring is compressed somewhat against member 48 so that wires 21 and 22 are stretched with substantial tension. This is brought about because there is sufficient tautness of ribbon 22 to compress the spring which is within the cylindrical portion of the bushing 50, against the upper collar 45 of the bushing. This causes the collar 45 to push against the wedged end of member 48 to maintain it in its position. Furthermore, owing to the fact that the hook 47 is of electrical conducting material, it makes contact with the spring 51, thereby putting the spring in circuit with the galvanometer coil. Spring 51 is finished off with a straight end running across the diameter of the spring so that hook 47 can be adjusted sideways to bring the coil 17 midway between the pole pieces. To make connection with the spring there is soldered at the end 52 of the spring, a suitable connecting wire 53 which is insulated from the casing. Wire 53 is led through the galvanometer casing, past the pole pieces 14 and 15, and is carried through the side 13 of the casing through an insulating bushing 54, into the interior of a terminal casing 55.

Terminal casing 55 is of insulating material such as fiber or Bakelite, or the like, and is fastened by screws 56 and 57 to the galvanometer casing. Casing 55 has a rectangular or square cross-section and is provided with an opening 58 running centrally through it. A collar 59 is located within the opening and is provided with a shoulder 60 to accommodate the head of a machine screw 61. The end of the machine screw is threaded into the drilled and threaded end of a thick metallic connecting slug 62 which is led into the terminal casing through opening 64. The uninsulated end of wire 53 is carried through the insulating bushing 54 and into the terminal casing 55 to a position between the lower edge of collar 59 and the upper end of connecting slug 62 so that the drawing up of the slug 62 by turning the screw binds the wire 53 between the collar and the connecting slug. Connection to the slug may be made by a suitable connecting means, such as a flexible insulated conductor 62a, the end of which may be fastened into the slug 62.

When the galvanometer is assembled, the mirror 27 is located back of an opening 65 through wall 12 of the galvanometer casing and the face of the mirror faces the opening so that light coming through the opening will shine on the mirror and be reflected from it back through the opening. A suitable lens 66 is held in a lens holder 67 in front of the opening 65. For convenience, the lens holder is provided with a second lens 68 of a different focal length from lens 66 so that if it is desired to use the second lens instead of the first, the lens holder may be rotated on pivot 69 to put lens 68 into position in front of opening 65, instead of lens 66.

In a recording camera it is common to use a number of the galvanometers of the type which is described, and to place them as closely together as practicable, so that all the galvanometers can make a record on a single sheet of photographic paper or film which is drawn past them while they are in oscillation, of their light traces. Furthermore, a magnetizing means is required for magnetizing the pole pieces 14 and 15. An arrangement suitable for this purpose is shown in Figs. 16 and 17 wherein there is shown a permanent magnet 70 of relatively large and heavy construction as compared with the galvanometer element. At the air gap 71 of this magnet there are formed a number of tongues 72 protruding from one of the magnet poles and a number of similar tongues 72A protruding from the other magnet pole. The two sets of tongues 72 and 72A extend toward each other as shown in Fig. 16, and each tongue 72 on one pole of the magnet has a counterpart 72A oppositely disposed on the other pole of the magnet. Between each adjacent pair of tongues 72 there is formed a space 73 large enough to accommodate the galvanometer pole piece 14; and pole piece 15 will be located between the opposite adjacent tongues 72A. The bases of pole pieces 14 and 15 rest on ledges 76 and 76A respectively attached to the respective poles of the magnet. A number of the galvanometers may thus be placed side by side with their pole pieces 14 and 15 located within respective opposite spaces 73 and 73A.

The pole pieces 14 and 15 are adapted to fit snugly within their respective spaces 73 and 73A and may be moved somewhat relative to the tongues in a vertical plane; that is, the galvanometer may be tilted back and forth to adjust the tilt of the mirror 27 somewhat so that the vertical level of its reflected light beam may be adjusted somewhat. To provide for this adjustment there is provided at the back of each space 73 and 73A an adjustable cam, the cams back of spaces 73 being numbered 74 and the cams back of spaces 73A being numbered 74A. Each adjustable cam is attached to a screw head 75, so that by turning the screw the cam is turned. By turning corresponding opposite pairs of cams 74 and 74A in this manner, accurate adjustment of the tilt of the galvanometer is had, while still maintaining good magnetic contact between the poles of the magnet and the pole pieces 14 and 15.

An advantage of interleaving the pole pieces 14 and 15 with the tongues on the magnet is to obtain a maximum of magnetic energy transfer from one to the other to increase the efficiency of the magnetic circuit. In short, the contact area between the pole pieces and magnet is greatly increased by the interleaved tongue. This increased contact area more than compensates for the loss in efficiency of the magnetic circuit resulting from the small air gap between the pole pieces and the magnet.

Ordinarily, after the galvanometer is assembled, the protruding rod 30 will be cut off at point 76 flush with the end of member 31. Attachment may then be made to this terminal of the galvanometer by clipping a wire to member 31. Attachment to the other end of the galvanometer is made at the permanently connected wire 64, as described above.

It will be recognized that by virtue of the construction and arrangement of the galvanometer, there is provided by my invention an exceedingly small and lightweight device capable of accurate adjustment.

The construction is simple for the additional reason that the entire mechanical oscillatory arrangement rotates on the axis of the supporting wires 21 and 22, making it in effect a single axis galvanometer.

The arrangement has the advantage over most other galvanometers of this type in that in the present galvanometer, the electrical circuit is entirely insulated from the casing so that the galvanometer need not have one side grounded if grounding is not desired.

By reason of the slidable member 41, the natural period of the oscillatory coil and mirror system may readily be adjusted, which is a factor of great convenience and desirability in such an instrument.

An outstanding advantage of the galvanometer is that the adjustment of tilt of the mirror, that is, the direction of the reflected light beam, may be made without affecting the magnetic circuit. Regardless of the adjustment due to the cams 74 and 74A, the pole pieces 14 and 15 are always held firmly between the tongues of the magnet, and the adjustment does not affect or alter the magnetic circuit. This is a distinct advantage over prior known constructions wherein such adjustments of position have involved the alteration of an air gap in the magnetic circuit, thereby affecting the strength of the magnetic circuit and accordingly affecting undesirably, the constants of the galvanometer.

The whole assembly is of such small dimensions that a large number of them can be used in a portable recording oscillograph, each assembly having the sensitivity usually associated with stationary laboratory oscillographs.

The whole coil and mirror assembly is of symmetrical design about the axis of rotation so that it does not respond to external mechanical shock.

I claim:

1. Means for supporting a coil in the form of an elongated loop so that it can undergo rotary oscillation about its longitudinal axis, comprising a fillet in each end of the loop and a pair of supporting wires, each supporting wire having a loop passing under the fillet, the supporting wires being stretched apart in tension, the respective ends of the coil being wrapped around the respective loop of the supporting wire and electrically connected to the supporting wire.

2. An ungrounded galvanometer comprising an elongated casing, a pair of magnet pole pieces set through opposite sides of the casing and defining an air gap within the case, a coil of wire in the shape of an elongated loop suspended within the air gap, a pair of supporting wires of larger diameter than the coil wire attached on each end of the loop and electrically connected thereto, retaining means mounted in one end of the case and insulated therefrom for holding one of these supporting wires, a coil compression spring located at the opposite end of the case and insulated from the case with its longitudinal axis coaxial with the longitudinal axis of the wire coil, a non-conductive retainer wedged in the case for holding the spring in the end of the case, hook means attached to the other of the supporting wires for hooking it to the end of the coil spring remote from the wire coil, thereby compressing the spring and tensioning the supporting wires, and means for making electrical connection to the retaining means and coil spring, said last named means being insulated from the case.

3. An ungrounded galvanometer comprising an elongated casing, a pair of magnet pole pieces set through the opposite sides of the casing with an air gap therebetween, a coil of wire in the form of an elongated loop located within the air gap, a pair of supporting wires of larger diameter than the coil wire attached at each end of the loop and connected with a respective end of the coil, a mirror attached to one of the supporting wires, a support affixed to and insulated from one end of the galvanometer, one of the supporting wires being fastened to said support at the longitudinal axis of the galvanometer, a coiled spring coaxial with said longitudinal axis near the other end of the galvanometer, and the other supporting wire being hooked to said spring to maintain the wires in tension, means for making electrical connection to the two supporting wires, said supporting wires being insulated from the case and from each other so that the galvanometer is ungrounded, and a sliding sleeve located within the casing near the wire holding support and provided with a longitudinal slot with a protuberance over which the wire extending from the support to the coil rests, said protuberance being positioned to maintain the wire along the longitudinal axis, said sleeve acting as an adjustable slider to vary the total effective length of the wires.

4. A galvanometer comprising a pair of magnet pole pieces with an air gap therebetween, a coil of wire in the form of an elongated loop located in said air gap, a pair of wires supporting the coil with one of the wires attached at each end of the loop, a support affixed to one of the casings, one of the supporting wires being fastened to said support, and a sliding sleeve located within the casing near the wire support and provided with a longitudinal slot with a protuberance over which the wire extending from the support to the coil rests, said protuberance being positioned to maintain the wire along the longitudinal axis, and the sleeve acting as an adjustable slider to vary the total effective length of the wires.

5. Means for supporting a coil in the form of an elongated loop in a casing so that it can undergo rotary oscillation about its longitudinal axis, comprising a fillet in each end of the loop, a pair of supporting wires, each supporting wire having a loop passing through the fillet, the respective ends of the coil being wrapped around the respective loop of the supporting wire and electrically connected to the supporting wire, a support affixed to one end of the casing, one of the supporting wires being fastened to said support, and an adjustable slider within the casing near the wire support and in contact with the wire extending from said support to the coil, said slider serving to vary the effective length of the wires.

ARTHUR D. RICHARDSON.

REFERENCES CITED

The following references are of record in the file of this patent:

UNITED STATES PATENTS

| Number | Name | Date |
|---|---|---|
| 813,269 | Wynne | Feb. 20, 1906 |
| 1,702,650 | Hindle | Feb. 19, 1929 |
| 1,981,266 | Green | Nov. 20, 1934 |
| 2,149,442 | Kannenstine | Mar. 7, 1939 |
| 2,268,526 | Palmer | Dec. 30, 1941 |
| 2,389,081 | Redmond | Nov. 13, 1945 |